Patented Aug. 23, 1949

2,479,694

UNITED STATES PATENT OFFICE 2,479,694

POTASSIUM HYDROXIDE COMPOSITION

Glen H. Morey and Everet F. Smith, Terre Haute, Ind., assignors to Commercial Solvents Corporation, Terre Haute, Ind., a corporation of Maryland No Drawing. Application June 11, 1945, Serial No. 598,920

4 Claims. (Cl. 252—192)

Our invention relates to a novel process for obtaining potassium hydroxide in a finely-divided and highly-active state. More particularly, it relates to such finely-divided and highly-active potassium hydroxide in the form of a suspension in a mixture of a monoether and a primary monohydric alcohol containing from four to eight carbon atoms, and to a method for preparing such suspensions by heating solid potassium hydroxide or aqueous solutions thereof with the aforesaid monoether and alcohol, as described hereinafter.

For carrying out various chemical processes, it is often desirable to utilize potassium hydroxide in a finely-divided state, suspended in a carrying medium. This is particularly true, for example, in the reactions involving the absorption of 1-alkynes such as acetylene, in which a very large surface area of the potassium hydroxide must be present to absorb the acetylene and to convert it into a form suitable for subsequent reaction with carbonyl compounds to form acetylenic alcohols.

Ordinary mechanical methods for obtaining the potassium hydroxide in the finely-divided and highly-active state necessary for this and other purposes have presented many difficulties. Mechanical grinding of the solid potassium hydroxide has been difficult and not as effective as desired because the solid potassium hydroxide presents a waxy effect to the grinder and resists comminution. This results in a product that is too coarse for easy suspension in the carrying liquid, and too coarse for most effective use in the processes referred to.

We have now found that solid potassium hydroxide can be heated to its fusion temperature with a mixture of a monoether and an alcohol of the types hereinafter described and subsequently cooled with agitation below its melting point to form a slurry of finely-divided solid particles of highly reactive potassium hydroxide. Commercial potassium hydroxide U. S. P. pellets containing 10–13% water may be thus fused at a temperature around 100° C., and hence, a relatively low-boiling monoether can be used. With other grades containing lower percentages of water, it is necessary to use higher boiling monoethers, or to operate the reactor under pressure, in order to effect fusion.

We have also found that when a mixture of a monoether and an alcohol of the types hereinafter described is added to an aqueous solution of potassium hydroxide and the mixture distilled with accompanying vigorous agitation, with removal of the water from the distillate and return of the monoether and alcohol to the distillation vessel, the "free" water, as hereinafter defined, can be substantially completely separated from the mixture, leaving a two-phase liquid residue which, when agitated and cooled, is converted into a suspension of finely-divided, solid particles of highly reactive potassium hydroxide.

The removal of all of the distillable water, as mentioned above, does not leave the still residue completely anhydrous. On the contrary, it may contain up to slightly below one mole of water per mole of potassium hydroxide, depending on the boiling point and relative concentration of the liquid used for carrying out the dehydration. The water, however, does not behave like "free" water; it is apparently combined with the potassium hydroxide, and does not interfere with the activity of the residual anhydrous potassium hydroxide. In this connection, the expression "free" water herein referred to, is to be construed as meaning only that water which may be removed from the above-mentioned mixtures by distillation with a mixture of a monoether and a small proportion of a primary monohydric alcohol containing from four to eight carbon atoms.

The complete separation of water from the potassium hydroxide solution is not essential for the preparation of a solid, finely-divided, active product utilizable for the processes described. In fact, the preparation of a strictly anhydrous potassium hydroxide would not be practical, since it has a melting point of about 360° C., and would be difficult or impossible to maintain in fluid condition at the boiling temperatures of many of the monoethers of our invention. The product as it commonly appears in the so-called "dry" solid state as a commercial material is sufficiently dehydrated for our purposes. This form of potassium hydroxide fortunately can be maintained in a liquid condition at temperatures considerably below the melting point of anhydrous potassium hydroxide, so that it remains in fluid form at the boiling temperatures of the various monoethers of our invention; and in such fluid condition the potassium hydroxide may readily be comminuted by the vigorous agitation and cooling employed in our process, and thereby finely dispersed in the carrying liquids described. Other liquids which we may use have somewhat higher boiling temperatures, but as a matter of convenience the majority of the liquids most adaptable to our processes will have boiling points ranging from about 100° to 250° or 300° C., considerably below the melting point of the anhydrous potassium hydroxide.

The particular advantages of the potassium hydroxide composition of the present invention will be recognized when it is recalled that with prior existing methods involving the utilization of anhydrous potassium hydroxide, workers were confronted with the problem of recovering large quantities of that material from aqueous mixtures, dehydrating the potassium hydroxide, and then pulverizing it for re-use in the succeeding batch. It will be obvious that this requirement renders such practice substantially useless from an industrial point of view, since it is not economically feasible to recover large quantities of potassium hydroxide from aqueous mixtures thereof in an anhydrous condition and then to grind the materials to a finely-divided powder suitable for re-use.

In accordance with our invention, we utilize hydrous potassium hydroxide, either as the solid base, preferably the U. S. P. grade which contains approximately 12.5 per cent by weight of water, or aqueous potassium hydroxide of substantially any concentration, although of course, the more concentrated the solution, the more quickly will the water separation be effected.

The potassium hydroxide or solution thereof, as the case may be, is mixed with the appropriate monoether and alcohol as described hereinafter and is subjected to distillation in such a manner that the "free" water is removed as a separate layer from the distillate, and discarded, while the monoether and alcohol are continuously returned to the distillation vessel. Distillation is continued until no more water distills over. The still contents then exist in the form of two liquid phases, one phase comprising the monoether and alcohol, the other the fluid potassium hydroxide. After the distillation is complete, the contents of the distillation vessel are allowed to cool, usually down to room temperature to permit solidification of the potassium hydroxide, and during this cooling stage the vigorous agitation is continued. The agitation may be effected by any of the convenient known methods, but the turbulence should be of a magnitude sufficient to effect fine precipitation and thorough dispersion of the finely-divided particles. Potassium hydroxide, treated in this manner, presents a greater active surface than that produced by mechanical means, or by other processes using different types of dehydrating liquids; hence, a given weight of such potassium hydroxide will produce a greater weight of product in the reactions for which it is adapted.

We obtain our improved finely-divided and highly-active potassium hydroxide by the use of mixtures of monoethers and a small proportion of a primary monohydric alcohol containing from four to eight carbon atoms. Such mixtures function to remove water from potassium hydroxide solutions, they do not react irreversibly with potassium hydroxide, and furthermore they have been observed to have the property of activating potassium hydroxide for many reactions, the degree of activation being greatly enhanced by our processing techniques. Monoethers which are to be utilized under atmospheric pressure should preferably possess a boiling point of at least about 100° C. Lower-boiling monoethers can be used, but require the application of super-atmospheric pressures in order to produce the desired liquid layer of potassium hydroxide. Specific examples of suitable monoethers are n-butyl ether, phenyl ether, n-octyl ether, ethyl phenyl ether, and the like.

As specific examples of the alcohols suitable for use in our process may be mentioned butanol, isobutyl alcohol, n-amyl alcohol, isoamyl alcohol, 1-octanol, ethylene glycol monoethyl ether, and tetrahydrofurfuryl alcohol.

The proportion of alcohol to monoether may vary considerably. However, it has been our general observation that satisfactory results are consistently obtained when up to about 35 per cent of the alcohol, based on the total volume of the reaction menstruum, is utilized.

The finely-divided suspended particles of potassium hydroxide prepared by the use of mixtures of monoethers and a small proportion of primary monohydric alcohols containing from four to eight carbon atoms appear to differ decidedly both in size and physical structure from the particles of potassium hydroxide obtained by prior processes. They are, for example, somewhat more finely-divided than those formed in the monoethers without the presence of the alcohol, and of a fluffy or leafy character rather than of a sandy character such as is obtained in monoethers alone. The physical characteristics of our potassium hydroxide particles produce a more enduring type of suspension; and when the particles do settle somewhat, they settle loosely without compacting, and can readily be resuspended with gentle stirring.

Although the potassium hydroxide mixtures of the present invention absorb 1-alkynes readily, substantially all of the latter are released if the solution is then heated, and the residue can again be used for further absorption. These potassium hydroxide mixtures will, therefore, be found useful for the removal of 1-alkynes of the abovementioned class from various gas mixtures.

A surprising feature of our invention is the discovery that potassium hydroxide prepared in accordance with our invention using a mixture of monoethers and alcohols is substantially more reactive than when prepared with monoethers alone. This is illustrated by the data in the following examples, of which two were taken from experiments in which potassium hydroxide slurries were first saturated with acetylene and subsequently reacted with acetone to form 2-methyl-3-butyne-2-ol:

*Example I*

A mixture consisting of 558 ml. of n-butyl ether, 42 ml. (approximately 7%) of isoamyl alcohol, and 187 g. of potassium hydroxide U. S. P. pellets containing 13% of water, was refluxed for fifteen minutes, during which time two liquid layers were formed. The mixture was then cooled to —10° C. with agitation. The resulting composition consisted of a suspension of finely-divided solid particles of potassium hydroxide in n-butyl ether and butanol.

*Example II*

A mixture of 558 ml. of n-butyl ether, 42 ml. of butanol, and 561 g. of 33% potassium hydroxide solution in water was heated to reflux temperature, and the water removed therefrom in the form of an azeotropic mixture with the ether and alcohol, the latter being continuously separated from the water and returned to the still kettle. The evolution of water stopped when about 13% of water, based on the pure potassium hydroxide, remained in the still. The resulting two-phase liquid mixture was then cooled with agitation to —10° C., producing a slurry of finely-divided solid particles of potassium hydroxide in n-butyl ether and butanol. The slurry was then saturated with acetylene at —10° C., a total of 0.396 ft.$^3$, measured at 0° C. and 760 mm., being absorbed. The equivalent quantity of acetone (29.0 g.) was then added, and the product was hydrolyzed by addition of water. The resulting layers were separated and distilled to isolate the desired acetylenic alcohol. A total of 40.4 g. of 2-methyl-3-butyne-2-ol was isolated, corresponding to a conversion of 96%, based on acetone, and a menstruum output of 58.7 g./l.

*Example III*

To demonstrate the need for an alcohol in the reaction menstruum, as illustrated in Example II, the azeotropic dehydration of 561 g. of 33% potassium hydroxide solution in water was carried out using n-butyl ether (600 ml.) as the dehydrating agent, without an added alcohol. The resulting slurry was saturated with acetylene at —10° C., a total of 0.234 ft.$^3$, measured at 0° C. and 760 mm., being absorbed. The equivalent quantity of acetone (17.2 g.) was then added and the reaction product was processed as before. A total of 13.9 g. of 2-methyl-3-butyne-2-ol was isolated, corresponding to a conversion of 56%, based on acetone, and a menstruum output of only 20.2 g./l.

Examination of the data given in the above examples shows readily the obvious advantage from the use of potassium hydroxide of the type prepared by our improved procedure. Improved results of a similar character are obtained when using our improved type of potassium hydroxide in other chemical processes requiring an activated form of potassium hydroxide either as a reactant or as a catalyst. Examples of such uses include the preparation of chloretone, etc.

It will be obvious to those skilled in the art that other monoethers and alcohols of the character described, in addition to those specifically enumerated herein, may be utilized in carrying out our invention, and that the above examples are merely illustrative of our invention and in no way limit the scope thereof. On the contrary, it is intended that the present invention shall cover, by the terminology of the appended claims, all features of patentable novelty which are inherent therein.

This application is a continuation-in-part of our U. S. Serial No. 511,838, filed November 26, 1943. This case is now abandoned.

Having described our invention, what we claim is:

1. A process for producing a highly-active suspension of solid potassium hydroxide which comprises mixing a hydrous potassium hydroxide with a monoether having a boiling point within the range of about 100° to 300° C. which does not substantially react irreversibly with the potassium hydroxide, and from about 7 to 35 per cent of a primary monohydric alcohol containing from four to eight carbon atoms, heating the mixture above the melting point of the hydrous potassium hydroxide and distilling off any water which may be present in excess of about one mole of water per mole of potassium hydroxide, then cooling the resulting mixture to solidify the potassium hydroxide while vigorously agitating to produce a finely-divided, highly-active suspension of potassium hydroxide.

2. The process of claim 1 wherein said primary monohydric alcohol is butanol.

3. The process of claim 1 wherein said monoether is n-butyl ether.

4. A process of producing a highly-active suspension of solid potassium hydroxide which comprises mixing a hydrous potassium hydroxide with a liquid monoether having a boiling point within the range of about 100° to 300° C. which does not substantially react irreversibly with the potassium hydroxide, and from about 7 to 35 per cent of a primary monohydric alcohol containing from four to eight carbon atoms, distilling the mixture to remove water in the form of the azeotrope with said ether, removing the water from the distillate and returning the latter to the mixture, continuing the distillation until the water in the mixture is reduced to an amount not substantially exceeding one mole per mole of potassium hydroxide, the distillation being conducted at a temperature sufficiently high to cause at least partial fusion of the potassium hydroxide, cooling the mixture while vigorously agitating the same to solidify the potassium hydroxide and to produce a finely-divided, highly-active suspension of the same.

GLEN H. MOREY.
EVERET F. SMITH.

REFERENCES CITED

The following references are of record in the file of this patent:

UNITED STATES PATENTS

| Number | Name | Date |
|---|---|---|
| 1,835,271 | Burke et al. | Dec. 8, 1931 |
| 2,019,468 | Bacon | Oct. 29, 1935 |
| 2,288,667 | Allen et al. | July 7, 1942 |
| 2,326,099 | Kokatnur et al. | Aug. 3, 1943 |
| 2,367,273 | Hall et al. | Jan. 16, 1945 |
| 2,385,547 | Smith | Sept. 25, 1945 |